United States Patent [19]  
Starkweather

[11] 4,015,081  
[45] Mar. 29, 1977

[54] MULTIFUNCTION SCANNING SYSTEM
[75] Inventor: Gary K. Starkweather, Saratoga, Calif.
[73] Assignee: Xerox Corporation, Stamford, Conn.
[22] Filed: Feb. 3, 1975
[21] Appl. No.: 546,476
[52] U.S. Cl. .............................. 358/206; 358/300; 358/302
[51] Int. Cl.² ....................................... H04N 3/08
[58] Field of Search ............... 178/7.6, 7.7, 6.6 R, 178/6.7 A, 6

[56] References Cited  
UNITED STATES PATENTS 3,316,348 4/1967 Hufnagel ...................... 178/6.6 R
3,465,352 9/1969 Carlson ......................... 178/6.6 R
3,573,849 4/1971 Herriot ............................. 178/6.7

Primary Examiner—Richard Murray  
Assistant Examiner—Edward L. Coles  
Attorney, Agent, or Firm—Sheldon F. Raizes

[57] ABSTRACT

A scanning system is employed which utilizes an unmodulated beam for reading a document (original size or microfilm) and utilizes a modulated beam for printing an image (original size or a microimage) which beams both originate from the same laser source and strike the same facets of a polygon scanner at the same location or at spaced vertically aligned locations.

10 Claims, 4 Drawing Figures

MULTIFUNCTION SCANNING SYSTEM

DESCRIPTION OF THE INVENTION

This application is related to copending U.S. applications Ser. Nos. 546,477 and 546,478, both of which were filed on Feb. 3, 1975, and are assigned to the same assignee of this application.

Scanning systems employing an unmodulated beam for reading a document and a modulated beam for printing an image and which beams originate from the same illumination source are well known. Such systems usually direct the different beams to different facets on a polygon scanner. Such a system is disclosed in U.S. Pat. No. 3,465,352. This type of system requires precise alignment of the facets for synchronization thereby requiring very stringent manufacturing tolerances.

Therefore, to overcome the above problem, it is an object of this invention to employ a scanning system which utilizes an unmodulated beam for reading a document and a modulated beam for printing an image which beams strike the same facets of a polygon scanner at the same location or at spaced vertically aligned locations.

It is a further object of this invention to provide a system which is capable of scanning images on microfilm or original size documents for purposes of converting information developed thereby into electrical signals and to electronically reproduce images on microfilm or on a recording medium.

Other objects of this invention will become apparent from the following description with reference to the drawings wherein.

Figure 1:
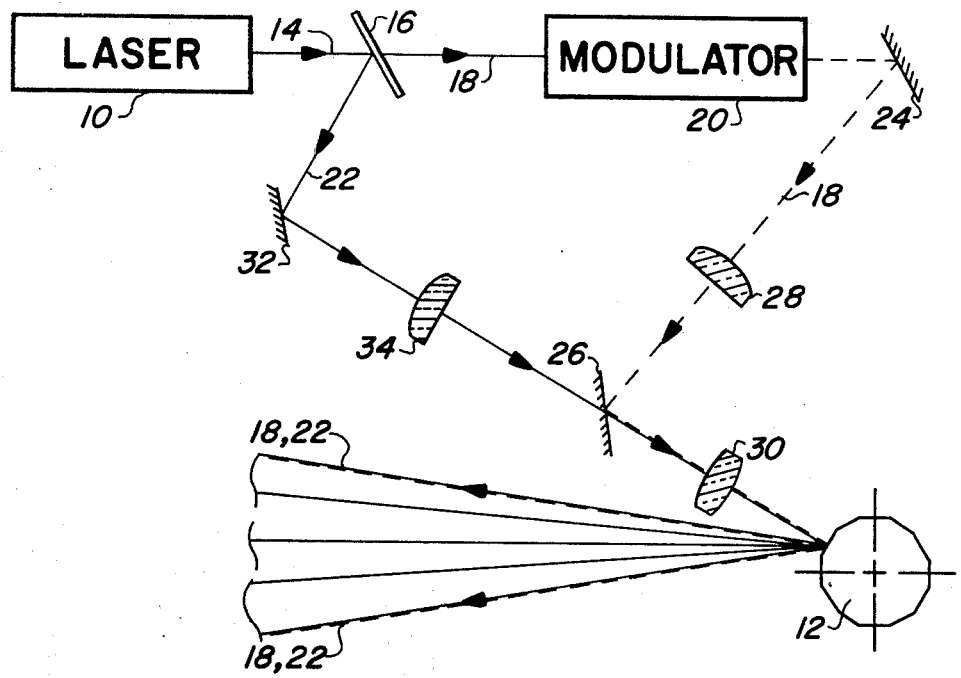
FIG. 1 is a partial plan view of a spot scanning system.

FIG. 1 is a plan view of the path of a modulated beam and an unmodulated beam from a laser 10 to a polygon scanner 12 which scans the beams in an X direction perpendicular to the axis of the polygon. A collimated beam 14 is generated by the laser 10. A beam splitter 16 is in the path of the beam 14 and allows a portion 18 of the beam to pass therethrough to an acousto-optic modulator 20 while also reflecting a portion 22 of the beam therefrom as an unmodulated beam. The modulator 20 modulates the beam 18 in conformance with information contained in an electrical signal. The modulated beam is reflected by mirrors 24 and 26 to the scanner 12. A cylinder lens 28 is positioned between the mirrors 24 and 26 and a spherical imaging lens 30 is located between the mirror 26 and the scanner 12 and in the path of the modulated beam 18. The cylinder lens 28 has its power plane in the tangential plane which is substantially perpendicular to the axis of rotation of the polygon 12. The path of the beam 14 and the beam portion 18 from the laser to the polygon is substantially perpendicular to the axis of rotation of the polygon.

Figure 2:
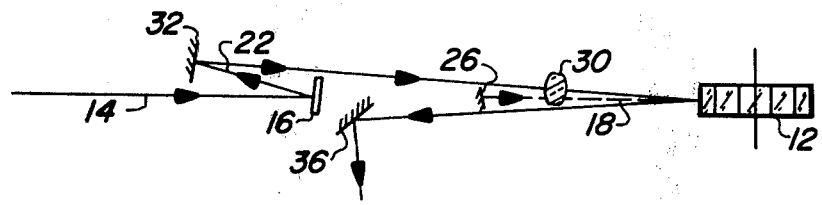
FIG. 2 is a side view of the partial view of FIG. 1.

Referring to FIG. 2, there is illustrated a side view of the unmodulated beam 22 path between the laser and the scanner. The beam portion 22 is reflected upwards by the beam splitter 16 to a fixed mirror 32 and reflected downwards to the scanner 12. A cylinder lens 34, having its power plane in the tangential plane, is located in the path of beam 22 to spread the beam and imaging lens 30 is also in the path of the beam 22.

Figure 4:
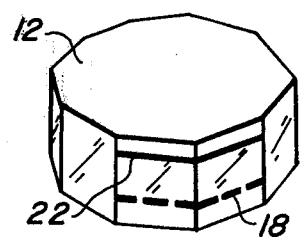
FIG. 4 is a view of a polygon scanner receiving two laser beams.

The imaging lens 30 is equally spaced from each cylinder lens 28, 34 so the beam size for each beam will be equal at the polygon. The polygon will have a number of reflecting facets thereon and normally the beam width in the scanning direction will be equal to at least the width of two facets. The beams 20 and 22 will strike the same facets simultaneously and may be either vertically spaced (in a direction parallel to the axis of polygon rotation) with the widths of the beam being axially aligned, as shown in FIG. 4, or the two beams may strike the very same spot on the facets and thereby coincide with each other as shown in FIGS. 1–3.

Figure 3:
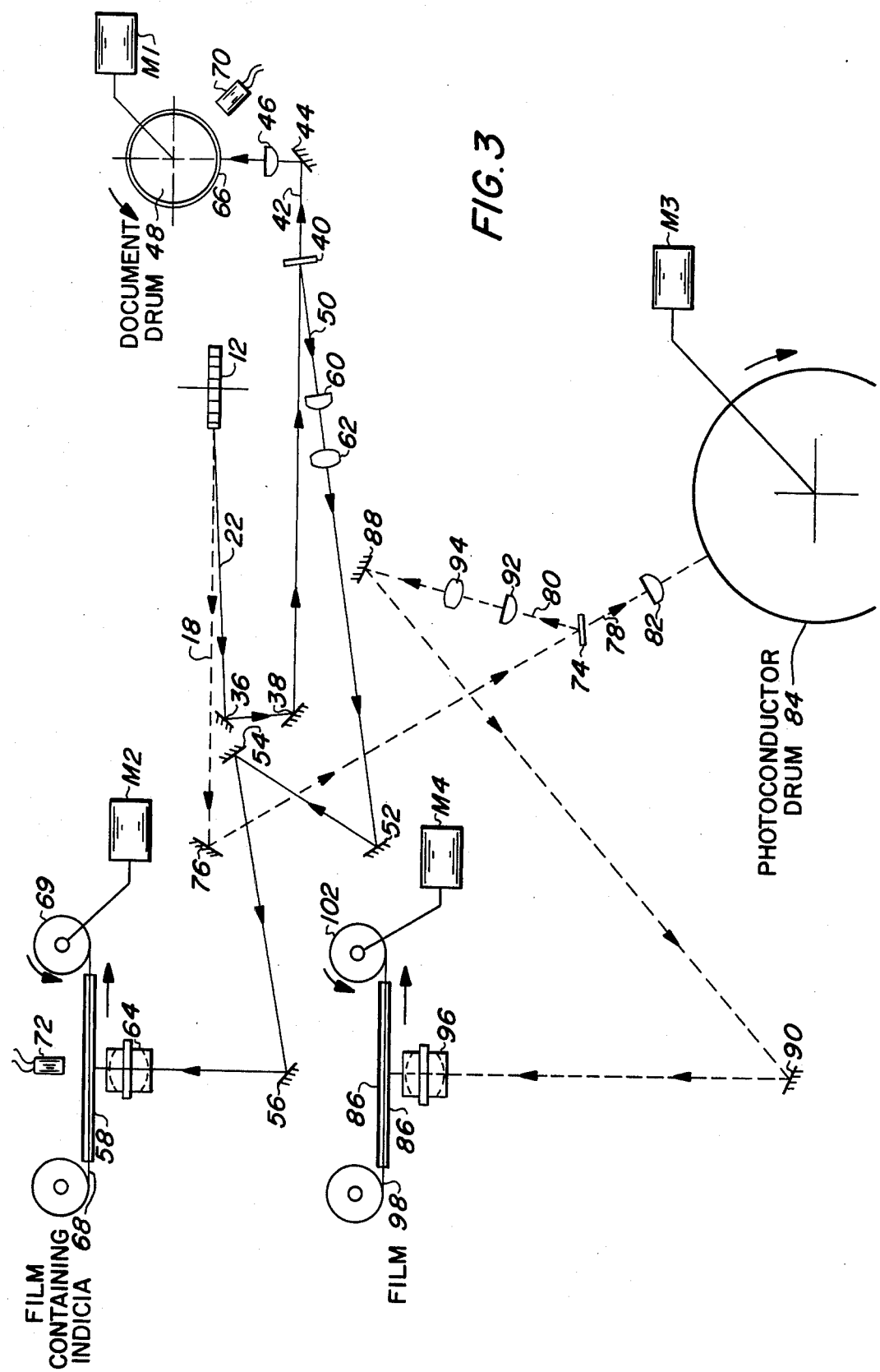
FIG. 3 is a side view of the spot scanning system which is complementary to the portion thereof depicted in FIGS. 1 and 2.

Referring to FIG. 3, a side view of the beam paths is depicted with the path shown in FIGS. 1 and 2 continuing at the polygon. The unmodulated beam 22 is reflected downwards by the polygon facets and is directed by mirrors 36 and 38 to a beam splitter 40 wherein a portion 42 of the beam 22 passes through the beam splitter 40 to a mirror 44 and is directed thereby through a cylinder lens 46 to a document retainer drum 48 which is rotated by a motor $M_1$. The cylinder lens 46 has its power plane in the sagittal plane (parallel to the axis of rotation of the scanner). Another portion 50 of the beam 22 is reflected from the beam splitter 40 and is directed by mirrors 52, 54 and 56 to a platen comprising spaced glass plates 58. A cylinder lens 60 and a field lens 62 are positioned between the beam splitter 40 and the mirror 52 and in the path of the beam 50 and a microlens 64 is positioned between the platen 58 and the mirror 56 and in the path of the beam 50. The cylinder lenses 46 and 60 are equally spaced along the optical path from the imaging lens 30.

The cylinder lens 34 and the imaging lens 30 act in conjunction to focus the beam 22, 42 in the tangential plane within a depth of focus located on the surface of the drum 48. The same lenses also act in conjunction to focus the beam 22, 50, in the tangential plane, within a depth of focus which is located at the field lens 62. The imaging lens 30 and the cylinder lens 46 act in conjunction to focus the beam 22, 42, in the sagittal plane, within a depth of focus located on the surface of drum 48. The imaging lens 30 and the cylinder lens 60 act in conjunction to focus the beam 22, 50, in the sagittal plane, within a depth of focus located at the field lens 62. The field lens directs the beam 50 to the microlens 64 which is designed to reduce the beam 50 to a spot of about one-tenth of its normal size and focus the same within a depth of focus which is located on the platen 58.

The drum 48 is designed to hold a document 66 thereon for scanning by the portion 42 of the beam 22. The drum may be of the same construction as a facsimile drum 15 and document gripper bar 20 assembly disclosed in U.S. Pat. No. 3,618,123. a microfilm 68 is slidably disposed between glass plates 58 and has indicia thereon to be scanned by the portion 50 of the beam 22. A motor $M_2$ is operatively connected to a take-up spool 69 to rotate the same to move the film to provide a scan in the longitudinal or Y direction which is generally perpendicular to the X direction of scan. The motors $M_1$ and $M_2$ may be synchronized with the scanning polygon 12 in any well-known manner. A photomultiplier sensor 70 is located to sense the change in intensity of the beam 42 as it sweeps across the document 68 and a photomultiplier 72 is located to sense the change of intensity of the beam 50 as it passes through the film when the beam sweeps thereacross. The photomultipliers 70 and 72 convert the beam intensity changes into electrical signals which represent the information on the document 66 or on the film 68, respectively.

The modulated beam 18 is reflected off the facets of polygon 12 in the same horizontal plane that it approached the polygon. The beam 18 is directed downwards to a beam splitter 74 by a mirror 76 with a portion 78 of the beam 18 passing through the beam splitter and the other portion 80 of the beam 18 reflecting off the beam splitter. The beam 78 passes through a cylinder lens 82 to a photosensitive drum 84 which may comprise a selenium coating. A motor $M_3$ is operatively connected to the drum 84 to rotate the same. The cylinder lens 82 has its power plane in the sagittal plane. The portion 80 of the beam 18 is directed to a platen comprising spaced glass plates 86 by mirrors 88 and 90. A cylinder lens 92 and a field lens 94 are located in the path of the beam 80 between the beam splitter 74 and mirror 88 and a microlens 96 is positioned between the platen 86 and the mirror 90 and in the path of beam 80. The cylinder lenses 82 and 92 are equally spaced along the optical path from the imaging lens 30 and are spaced the same optical distance from imaging lens 30 that the cylindrical lenses 46 and 60 are. Consequently, each cylinder lens 82, 92, 46 and 60 is spaced an equal distance from its respective beam splitter, each cylinder lens 82, 92, 46 and 60 is equally spaced from the polygon and the surfaces of the document drum 48 and the photoreceptor 84 are equally optically spaced from the imaging lens 30. The cylinder lens 28 and the imaging lens 30 act in conjunction to focus the beam 18, 78 in the tangential plane within a depth of focus located on the surface of the photosensitive drum 84. The same lenses also act in conjunction to focus the beam 18, 80, in the tangential plane, within a depth of focus which is located at the field lens 94. The imaging lens 30 and the cylinder lens 82 act in conjunction to focus the beam 18, 78, in the sagittal plane, within a depth of focus located on the surface of the photosensitive drum 84. The imaging lens 30 and the cylinder lens 92 act in conjunction to focus the beam 18, 80, in the sagittal plane, within the depth of focus located at the field lens 94. The field lens 94 directs the beam 80 to the microlens 64 which is disposed to reduce the beam 80 to a spot of about one-tenth of its normal size and focus the same within a depth of focus which is located on the platen 86.

The modulated beam 78 imposes a latent image on the photo-sensitive drum 84 in accordance with information transmitted to the modulator. The latent image is developed with toner particles by any well-known xerographic method and the developed image is transferred to a copy medium by any well-known method to provide a hard copy of the information. The motor $M_3$ may be synchronized with the scanning polygon 12 and the modulator 20 in any well-known manner.

A film 98 is slidably disposed between glass plates 86 which is sensitive to the beam 80 to record information thereon in accordance with the information fed to the modulator. The image recorded on the film 98 will be in the form of a microimage due to the reduction of the beam spot by the microlens 96. A motor $M_4$ is operatively connected to a take-up spool 102 to rotate the same to move the film to provide a scan in the longitudinal or Y direction. The motor $M_4$ may be synchronized with the scanning polygon 12 and the modulator 20 in any well-known manner.

By designing the system that the unmodulated beam 22 and the modulated beam 18 simultaneously strike the same facets of the polygon at the very same areas or in vertical alignment with each other allows simple scanning synchronization of the beams. If the separate beams were directed to separate facets, then the facets would have to be much more precisely aligned with each other requiring very stringent manufacturing tolerances.

While both beams are shown generated by a single laser source, it should be appreciated that separate laser sources could be utilized to generate separate beams. Also, the beam splitter 16 could be eliminated by utilizing a laser which generates separate beams from the front and rear ends, such as the laser 10 depicted in U.S. Pat. No. 3,316,348. In each case, suitable means can be utilized to direct the separate beams to the same spot on the polygon 12.

The four stations, i.e., document drum, image containing microfilm, the photosensitive drum and the microfilm station may be designed to operate in many combinations of functions. For instance, the document 66 and the microfilm 68 can be read separately with the photomultiplier for each sending separate signals in a transmission mode. The signals from either photomultiplier may be transmitted to a remote recorder for producing a copy in accordance with the signals or can be utilized to control modulator 20 to produce a reproduction on the film 98 or the photosensitive drum 84, or both simultaneously. Both the document 66 and the microfilm 68 may be read simultaneously and signals sent to several remote recorders for reproducing a copy in accordance with a respective signal. Or the document 66 and the microfilm 68 may be read simultaneously and the signals combined and sent to a remote recorder or used to control the modulator 20 to print a combined image on either the photoconductor 84 or the film 98 or both of the image on the document and the image on the microfilm 68. In this instance, the document 66 can contain the image of a form and the microfilm 68 can contain the image of information to be placed in the form, or vice versa. The modulator 20 may also be controlled by a computer or a remote data source. The computer may receive its information from a tape, or the photomultipliers 70 and 72 may send information to a buffer which stores the information and interfaces with the computer when the computer requests information.

Each station can be designed to be selectively addressed by providing suitable circuits which permits selective actuations of the motors for operating the films or drums. Also, solenoid operated shutter mechanisms may be placed in the path of beam portions 42, 50, 78 or 80 to either block its respective beam or allow the same to pass to its respective station. Again, suitable circuits can be designed to selectively operate the individual shutters.

What is claimed is:

1. In a flying spot scanning system: an illumination source generating a collimated beam, a beam splitter in the path of said beam permitting a portion of said beam to pass therethrough and redirecting another portion of the beam, a pair of imaging stations, a reading station, a rotatable polygon scanner optically located between said beam splitter and each of said stations, a modulator located between said beam splitter and said polygon in the path of one of said beam portions for modulating said one beam portion, means for directing each portion of said beam along separate paths to said polygon, the width of each beam portion in the direction of scan at the polygon being substantially the same, said beam portions being aligned on said polygon in a direction parallel to the axis of rotation, said directing means directing said beam portions to said polygon along such paths that said beam portions will reflect from said polygon along separate paths, an imaging lens optically located between said polygon and said beam splitter and located in the path of both said modulated and unmodulated beams, a cylinder lens for each beam located between said beam splitter and said imaging lens, said cylinder lenses each having its power plane in a plane generally perpendicular to the axis of rotation of said polygon, said reading station being in the path of the unmodulated beam, a beam splitter optically located between said imaging stations and in the path of said modulated beam reflected from said polygon, said last named beam splitter directing a portion of said modulated beam to one of said imaging stations and allowing another portion of said modulated beam to pass to the other of said imaging stations.

2. The scanning system of claim 1 further comprising a second reading station, a beam splitter optically located between said reading stations and in the path of said unmodulated beam reflected from said polygon, said last named beam splitter directing a portion of said unmodulated beam to one of said reading stations and allowing another portion of said unmodulated beam to pass to the other of said reading stations.

3. The scanning system as recited in claim 1 further comprising a cylinder lens located in the path of each modulated beam between its respective imaging station and said last named beam splitter and equally spaced from said last named beam splitter, each of said last named cylinder lenses having its power plane in a plane generally parallel to the axis of polygon rotation.

4. In a flying spot scanning system: an illumination source generating a collimated beam, a beam splitter in the path of said beam permitting a portion of said beam to pass therethrough and redirecting another portion of the beam, an imaging station, a pair of reading stations, a rotatable polygon scanner optically located between said beam splitter and each of said stations, a modulator located between said beam splitter and said polygon in the path of one of said beam portions for modulating said one beam portion, means for directing each portion of said beam along separate paths to said polygon, the width of each beam portion in the direction of scan at the polygon being substantially the same, said beam portions being aligned on said polygon in a direction parallel to the axis of rotation, said directing means directing said beam portions to said polygon along such paths that said beam portions will reflect from said polygon along separate paths, an imaging lens optically located between said polygon and said beam splitter and located in the path of both said modulated and unmodulated beams, a cylinder lens for each beam located between said beam splitter and said imaging lens, said cylinder lenses each having its power plane in a plane generally perpendicular to the axis of rotation of said polygon, said imaging station being in the path of the modulated beam, a beam splitter optically located between said reading stations and in the path of said unmodulated beam reflected from said polygon, said last named beam splitter directing a portion of said unmodulated beam to one of said reading stations and allowing another portion of said unmodulated beam to pass to the other of said reading stations.

5. The scanning system as recited in claim 4 further comprising a cylinder lens located in the path of each unmodulated beam between its respective reading station and said last named beam splitter and equally spaced from said last named beam splitter, each of said last named cylinder lenses having its power plane in a plane generally parallel to the axis of polygon rotation.

6. In a flying spot scanning system: an illumination source generating a collimated beam, a first beam splitter in the path of said beam permitting a portion of said beam to pass therethrough and redirecting another portion of the beam, a pair of imaging stations, a pair of reading stations, a rotatable polygon scanner optically located between said first beam splitter and each of said stations, means directing said beam portions along separate paths to said polygon, a modulator located between said first beam splitter and said polygon in the path of one of said beam portions for modulating said one beam portion, a first lens optically located between said polygon and said first beam splitter and located in the path of both said modulated and unmodulated beams, the width of each beam portion in the direction of scan at the polygon being substantially the same, said beam portion being aligned on said polygon in a direction parallel to the axis of rotation, said directing means directing said beam portions to said polygon along such paths that said beam portions will reflect from said polygon along separate paths, a second beam splitter optically located between said imaging stations and said polygon and in the path of said modulated beam reflected from said polygon, said second beam splitter directing a portion of said modulated beam to one of said imaging stations and allowing another portion of said modulated beam to pass to the other of said imaging stations, a third beam splitter optically located between said reading stations and said polygon and in the path of said unmodulated beam reflected from said polygon, said third beam splitter directing a portion of said unmodulated beam to one of said reading stations and allowing another portion of said unmodulated beam to pass to the other of said reading stations, second and third lenses each of which is cylinder and located in the path of a respective modulated beam between its respective imaging station and said second beam splitter, said second and third lenses being equally spaced from said second beam splitter, fourth and fifth cylinder lenses each of which is cylinder and located in the path of a respective unmodulated beam between its respective reading station and said third beam splitter, said fourth and fifth cylinder lenses being equally spaced from said fourth beam splitter, each of said cylinder lenses having its power plane in a plane generally parallel to the axis of polygon rotation.

7. The scanning system of claim 6 further comprising sixth and seventh lenses each of which is cylinder and located in the path of a respective beam between said first beam splitter and said first lens, said first lens being an imaging lens, said sixth and seventh cylinder lenses each having its power plane in a plane generally perpendicular to the axis of rotation of said polygon.

8. In a flying spot scanning system: an illumination source generating a collimated beam, a beam splitter in the path of said beam permitting a portion of said beam to pass therethrough and redirecting another portion of the beam, an imaging station, a reading station, a rotatable polygon scanner optically located between said beam splitter and each of said stations, a modulator located between said beam splitter and said polygon in the path of one of said beam portions for modulating said one beam portion, means for directing each portion of said beam along separate paths to said polygon, the width of each beam portion in the direction of scan at the polygon being substantially the same, said beam portions being aligned on said polygon in a direction parallel to the axis of rotation, said directing means directing said beam portions to said polygon along such paths that said beam portions will reflect from said polygon along separate paths, an imaging lens optically located between said polygon and said beam splitter and located in the path of both said modulated and unmodulated beams, a cylinder lens for each beam located between said beam splitter and said imaging lens, said cylinder lenses each having its power plane in a plane generally perpendicular to the axis of rotation of said polygon, said imaging station being in the path of the modulated beam, said reading station being in the path of the unmodulated beam, a third cylinder lens optically located between said imaging station and said polygon and in the path of said modulated beam reflected from said polygon, a fourth cylinder lens optically located between said reading station and said polygon and in the path of said unmodulated beam reflected from said polygon, said third and fourth cylinder lenses being optically equally spaced from said polygon, the power plane of said third and fourth cylinder lenses being in a plane generally parallel to the axis of polygon rotation.

9. The scanning system of claim 8 wherein said beams are coincident on said polygon.

10. The scanning system of claim 8 wherein said beams are spaced from each other on said polygon in a direction parallel to the axis of rotation of said polygon.

* * * * *